(12) United States Patent
Emamdie et al.

(10) Patent No.: US 11,551,283 B2
(45) Date of Patent: Jan. 10, 2023

(54) METHODS AND SYSTEMS FOR PROVIDING A VEHICLE SUGGESTION BASED ON IMAGE ANALYSIS

(71) Applicant: Capital One Services, LLC, McLean, VA (US)

(72) Inventors: Michelle Emamdie, Saint Augustine, FL (US); Qiaochu Tang, The Colony, TX (US); Jiaxin Guo, Plano, TX (US); Derek Bumpas, Allen, TX (US); Jeremy Huang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 17 days.

(21) Appl. No.: 17/108,137

(22) Filed: Dec. 1, 2020

(65) Prior Publication Data

US 2022/0172270 A1  Jun. 2, 2022

(51) Int. Cl.
  *G06Q 30/06*  (2012.01)
  *G06F 16/9536*  (2019.01)
  *G06V 20/20*  (2022.01)
  *G06N 20/00*  (2019.01)
  *G06N 3/04*  (2006.01)

(52) U.S. Cl.
  CPC ..... *G06Q 30/0631* (2013.01); *G06F 16/9536* (2019.01); *G06Q 30/0627* (2013.01); *G06V 20/20* (2022.01); *G06N 3/04* (2013.01); *G06N 20/00* (2019.01)

(58) Field of Classification Search
  CPC ............................................... G06Q 30/06–08
  See application file for complete search history.

(56) References Cited

U.S. PATENT DOCUMENTS

| | | |
|---|---|---|
| 9,317,835 B2 | 4/2016 | Calman et al. |
| 9,697,538 B2 | 7/2017 | Balasubramanian et al. |
| 9,704,185 B2 | 7/2017 | Cunico et al. |
| 10,140,553 B1 | 11/2018 | Vasisht et al. |
| 10,223,611 B1 | 3/2019 | Price et al. |
| 2003/0105682 A1* | 6/2003 | Dicker ............... G06Q 30/0633 705/26.8 |

(Continued)

OTHER PUBLICATIONS

VIN Lookup—How To, by Evan Walton | Jun. 25, 2021 (Year: 2021).*

(Continued)

*Primary Examiner* — Ming Shui
(74) *Attorney, Agent, or Firm* — Bookoff McAndrews, PLLC

(57) ABSTRACT

Methods and systems are disclosed for providing a vehicle suggestion to a user based on image analysis. The method may include: receiving one or more vehicle images via website data associated with the user; identifying one or more first-level traits from the one or more vehicle images; obtaining one or more vehicle identifications from the one or more vehicle images based on the one or more first-level traits; determining a value of each of the one or more first-level traits and/or the one or more vehicle identifications via one or more algorithms; determining the vehicle suggestion based on the value of each of the one or more first-level traits and/or the one or more vehicle identifications; and transmitting, to a device associated with the user, a notification indicating the vehicle suggestion.

20 Claims, 4 Drawing Sheets

(56) References Cited

U.S. PATENT DOCUMENTS

| | | | | |
|---|---|---|---|---|
| 2011/0106817 | A1* | 5/2011 | Pan | G06Q 30/02 |
| | | | | 707/748 |
| 2012/0185474 | A1* | 7/2012 | Hansen | G06F 16/9537 |
| | | | | 707/E17.014 |
| 2012/0230548 | A1* | 9/2012 | Caiman | G06K 9/00671 |
| | | | | 382/104 |
| 2016/0379260 | A1* | 12/2016 | Balasubramanian | |
| | | | | G06F 16/5866 |
| | | | | 705/14.54 |
| 2019/0278994 | A1 | 9/2019 | Bumpas et al. | |
| 2020/0170564 | A1 | 6/2020 | Jiang et al. | |
| 2020/0311796 | A1 | 10/2020 | Tang et al. | |

OTHER PUBLICATIONS

Google says machine learning is the future. So I tried it myself, Alex Hern Jun. 28, 2016; (Year: 2016).*

Recommended For You: How machine learning helps you choose what to consume next, Jennifer Wei, Aug. 28, 2017 (Year: 2017).*

Machine Learning: What it is and why it matters, SAS, Jan. 7, 2014 (Year: 2014).*

International Search Report issued in International Application No. PCT/US2021/061131 dated Mar. 21, 2022 (14 pages).

Uliah Farhan et al: "Image-Based Service Recommendation System: A JPEG-Coefficient RFs Approach", IEEE Access, IEEE, USA, vol. 8, Dec. 25, 2019 (Dec. 25, 2019), pp. 3308-3318, XP011766137, DOI: 10.1109/ACCESS.2019.2962315 [retrieved on Jan. 7, 2020].

* cited by examiner

METHODS AND SYSTEMS FOR PROVIDING A VEHICLE SUGGESTION BASED ON IMAGE ANALYSIS

TECHNICAL FIELD

Various embodiments of the present disclosure relate generally to providing a suggestion to a user, and, more particularly, to providing a vehicle suggestion to a user based on image analysis.

BACKGROUND

Purchasers of relatively expensive items, such as vehicles, real estate, mattresses, boats, computers, etc. may conduct part or all of their shopping for such items online, via the Internet (e.g., via one or more online search user-interfaces). Such relatively expensive items often have numerous optional features or traits which may impact an overall cost of the item. In the context of a vehicle purchase, for example, a purchaser (e.g., a buyer or user) may weigh the cost of the vehicle against the various features or traits of that vehicle. In so doing, some of the features or traits may be determined more favorable to the purchaser than other features or traits (e.g., some features may be categorized as "must have features," while other features may be categorized as "like to have features" or "unneeded features"). Because each purchaser may have his/her own unique preference of available features or traits, it can be difficult for the purchaser to convey such preference information with traditional, often rigid, online search user interfaces. Consequently, the buyer/user may spend a significant amount of time researching vehicles before making a purchasing decision, which may lead to purchaser dissatisfaction and/or disengagement.

The present disclosure is directed to overcoming the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing a vehicle suggestion to a user based on image analysis. The disclosed methods and systems may improve a user's experience when making a purchasing decision, and may improve efficiency during the process of purchasing a vehicle.

In an aspect, a computer-implemented method for providing a vehicle suggestion to a user based on image analysis may include: receiving, via one or more processors, one or more vehicle images via website data associated with the user; identifying, via the one or more processors, one or more first-level traits from the one or more vehicle images, wherein the one or more first-level traits comprise at least one of a make, a model, a manufacture year, a color, a door count, or a seat count of one or more vehicles in the one or more vehicle images; obtaining, via the one or more processors, one or more vehicle identifications from the one or more vehicle images based on the one or more first-level traits; determining, via the one or more processors, a value of each of the one or more first-level traits and/or the one or more vehicle identifications via one or more algorithms; determining, via the one or more processors, the vehicle suggestion based on the value of each of the one or more first-level traits and/or the one or more vehicle identifications; and transmitting, to a device associated with the user, a notification indicating the vehicle suggestion.

In another aspect, a computer system for providing a vehicle suggestion to a user based on image analysis may include a memory storing instructions, and one or more processors configured to execute the instructions to perform operations. The operations may include: receiving one or more vehicle images via website data associated with the user; identifying one or more first-level traits from the one or more vehicle images, wherein the one or more first-level traits comprise at least one of a make, a model, a manufacture year, a color, a door count, or a seat count of one or more vehicles in the one or more vehicle images; obtaining one or more vehicle identifications from the one or more vehicle images based on the one or more first-level traits; determining a value of each of the one or more first-level traits and/or the one or more vehicle identifications via one or more algorithms; determining the vehicle suggestion based on the value of each of the one or more first-level traits and/or the one or more vehicle identifications; and transmitting, to a device associated with the user, a notification indicating the vehicle suggestion.

In yet another aspect, a computer-implemented method for providing a vehicle suggestion to a user may include: receiving, via one or more processors, website data associated with the user, wherein the website data includes one or more vehicle images from social network accounts associated with the user; identifying, via the one or more processors, one or more first-level traits from the one or more vehicle images, wherein the one or more first-level traits comprise at least one of a make, a model, a manufacture year, a color, a door count, or a seat count of one or more vehicles in the one or more vehicle images; obtaining, via the one or more processors, one or more vehicle identifications from the one or more vehicle images based on the one or more first-level traits; determining, via the one or more processors, one or more second-level traits based on the one or more vehicle identifications, wherein the one or more second-level traits comprise at least one of an engine type, a manufacturing region, or a manufacturing year of the one or more vehicles indicated via the one or more vehicle images; determining, via the one or more processors, a value of each of the one or more first-level traits, second-level traits, and/or the one or more vehicle identifications via one or more algorithms, the values being weighted values associated with a frequency that each first-level trait, second-level trait, and/or each vehicle identification appear in the one or more vehicle images; determining, via the one or more processors, the vehicle suggestion based on the value of each of the one or more first-level traits, second-level traits, and/or the one or more vehicle identifications; and transmitting, to a device associated with the user, a notification indicating the vehicle suggestion.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various

DETAILED DESCRIPTION OF EMBODIMENTS

Figure 1:
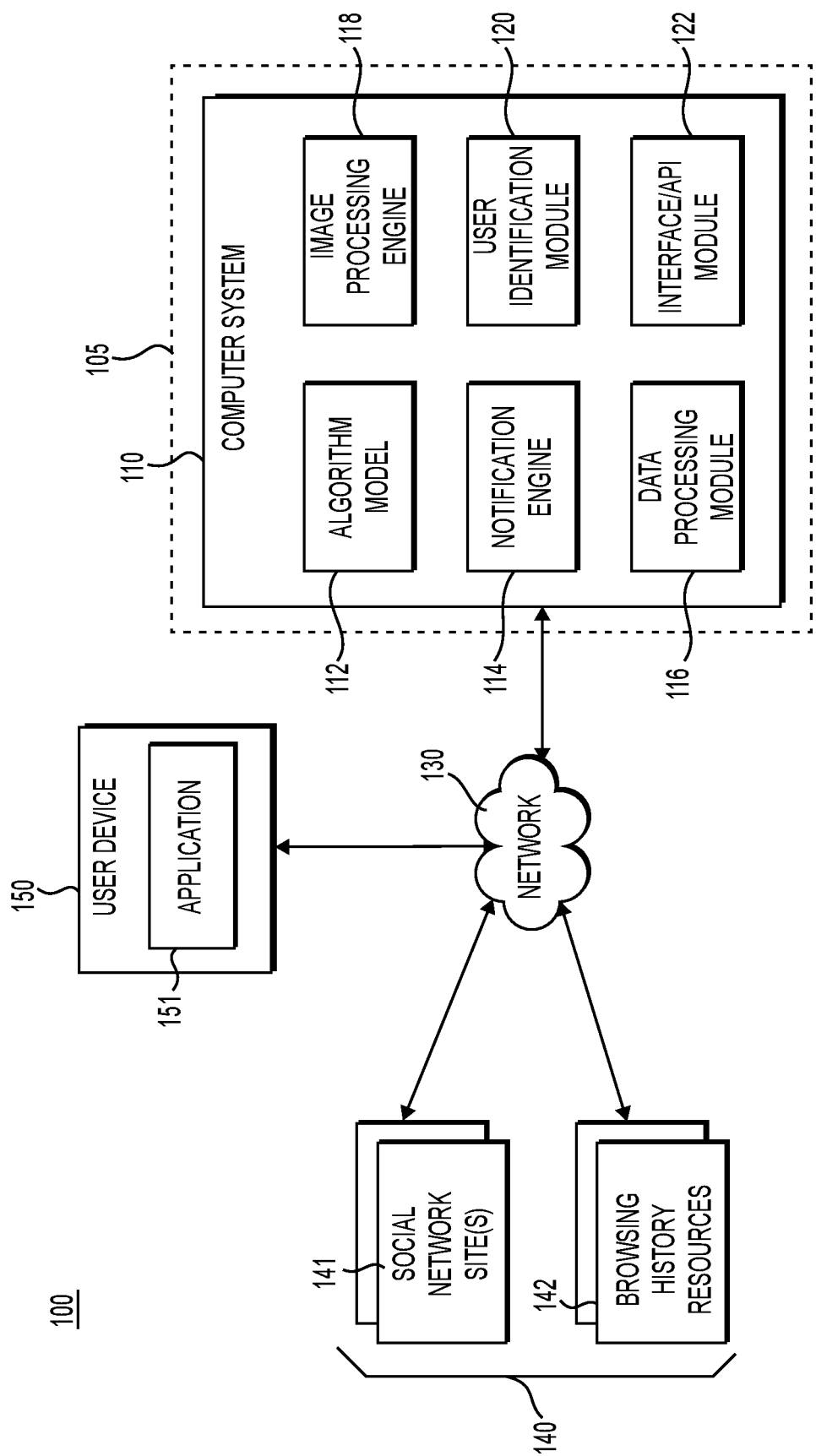
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as one or more vehicle images from website data, one or more vehicle identifications, one or more first-level traits, or one or more second-level traits may be used to determine a vehicle suggestion for the user. For example, systems and methods of the present disclosure may provide for receiving website data associated with a user, searching the website data for one or more vehicle images containing vehicles, identifying various traits of the vehicles in the vehicle images, and providing a vehicle suggestion based on the frequency that each trait appears in the vehicle images. In some embodiments, the systems and methods may identify a specific vehicle type in the vehicle images and provide a vehicle suggestion of that specific vehicle type. Embodiments of the present disclosure provide for a machine learning system for performing the steps discussed above.

The machine learning system may include a trained machine learning algorithm. Aspects of the trained machine learning algorithm are described elsewhere herein. The trained machine learning system of the present disclosure may result in improved speed or accuracy in determining vehicle suggestions. For example, the generation or filtering of training data (e.g., input images) may result in models that require fewer computing resources or increased processing speed. Further, the vehicle suggestion may be provided without user interaction based on the website data. Thus, vehicle suggestions may be provided to the user faster and more efficiently than present vehicle suggestion systems. Therefore, the embodiments of the present disclosure may provide for an improvement to technology areas, such as computing processing, as well as improvements to providing vehicle suggestions to a user. Further, the methods and systems provided herein may provide vehicle suggestions earlier in a user's interaction with an application that provides the vehicle suggestion. For example, when the user first opens the application, the vehicle suggestion may be provided without the user having to search, or otherwise browse, for a vehicle. Thus, the methods and systems of the present disclosure may save time for a user in finding a desired vehicle. Therefore, processing load on the system and/or application may also be reduced due to users spending relatively less time using the application and browsing for desired vehicles.

Referring now to the appended drawings, FIG. 1 is a diagram depicting an example of a system environment 100 according to one or more embodiments of the present disclosure. The system environment 100 may include a computer system 110, a network 130, one or more resources 140 for collecting data (e.g., one or more vehicle identifications), and a user device (or a device associated with a user) 150. The one or more resources 140 for collecting data may include one or more social network sites 141 and/or browsing history resources 142. These components may be in communication with one another via network 130.

The computer system 110 may have one or more processors configured to perform methods described in this disclosure. The computer system 110 may include one or more modules, models, or engines. The one or more modules, models, or engines may include an algorithm model 112, a notification engine 114, a data processing module 116, an image processing engine 118, a user identification module 120, and/or an interface/API module 122, which may each be software components stored in the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model. Details of algorithm model 112 are described elsewhere herein. The notification engine 114 may be configured to generate and communicate (e.g., transmit) one or more notifications (e.g., vehicle suggestions) to a user device 150 or to one or more resources 140 through the network 130. The data processing module 116 may be configured to monitor, track, clean, process, or standardize data (e.g., one or more vehicle images) received by the computer system 110. One or more algorithms may be used to clean, process, or standardize the data. The image processing engine 118 may be configured to monitor, track, clean, process, or standardize image data. Such image data may include any images taken by the user or individuals other than the user, or any images stored in databases associated with the one or more resources 140. The user identification module 120 may manage user identification for each user accessing the computer system 110. In one implementation, the user identification associated with each user may be stored to, and retrieved from, one or more components of data storage associated with the computer system 110 or one or more resources 140. The interface/API module 122 may allow the user to interact with one or more modules, models, or engines of the computer system 110.

Computer system 110 may be configured to receive data from other components (e.g., one or more resources 140, or user device 150) of the system environment 100 via network 130. Computer system 110 may further be configured to utilize the received data by inputting the received data into the algorithm model 112 to produce a result (e.g., a vehicle suggestion). Information indicating the result may be transmitted to user device 150 or one or more resources 140 over network 130. In some examples, the computer system 110 may be referred to as a server system that provides a service including providing the information indicating the received data and/or the result to one or more resources 140 or user device 150.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Social network sites 141 may include social network accounts associated with the user. The user may grant access to computer system 110 to access the social network accounts associated with the user. The social network sites 141 may include, for example, Pinterest, Facebook, Twitter, Instagram, Snapchat, Tumbler, Reddit, LinkedIn, or any other type of social network site 141. When the user grants access to the social network accounts associated with the user, the corresponding social network sites 141 may provide data associated with the user to the computer system 110. The user may post, upload, like, favorite, pin, or otherwise associate, the vehicle images to or with the social network site 141. Thus, the computer system 110 may receive the data associated with the user from the social network sites 141. For example, the computer system 110 may receive one or more vehicle images from the social network sites 141, as detailed further below.

Browsing history resources 142 may include webpages, e-mail, apps, or any other on-line resources for collecting website data associated with the user. As used herein, "website data" is any data, metadata, or the like associated with the webpages, e-mails, apps, social network sites, or other on-line resources that the user views, interacts with, or otherwise visits and/or browses. Browsing history resources 142 may be provided by the social network sites 141, manufacturers, vehicle dealers, retailers, consumer promotion agencies, and other entities. Browsing history resources 142 may include other computer systems, such as web servers, that are accessible by computer system 110. The user may provide access to the computer system 110 to website data associated with the user. For example, the user may provide login information for one or more web browsers, webpages, e-mail applications, applications, social network sites 141, or other on-line resources. The user may then browse the Internet by visiting webpages, e-mail, apps, etc. and the website data may be provided to the computer system 110. In some embodiments, the user may provide access to only certain types of website data. For example, the user may provide access to only website data that contains vehicle images. Thus, only website data that contains vehicle images may be provided to computer system 110.

The social network sites 141 and/or the browsing history resources 142 may each include one or more computer systems configured to gather, process, transmit, and/or receive data. In general, whenever any of social network sites 141 and the browsing history resources 142 are described as performing an operation of gathering, processing, transmitting, or receiving data, it is understood that such operations may be performed by a computer system thereof. In general, a computer system may include one or more computing devices, as described in connection with FIG. 4 below. Further, it is understood that the website data may include data associated with the social network sites 141.

User device 150 may operate a client program, also referred to as a user application 151 or third-party application, used to communicate with the computer system 110. This user application 151 may be used to accept user input or provide information (e.g., one or more vehicle images) to the computer system 110 and to receive information from the computer system 110. In some examples, the user application 151 may be a mobile application that is run on user device 150. In some examples, user application 151 may include a web browsing application for browsing the Internet. The web browsing application may collect website data as the user browses the Internet. The website data may be stored in one or more databases associated with the browsing history resources 142.

User device 150 may be a mobile device (e.g., smartphone, tablet, pager, personal digital assistant (PDA)), a computer (e.g., laptop computer, desktop computer, server), or a wearable device (e.g., smart watch). User device 150 can also include any other media content player, for example, a set-top box, a television set, a video game system, or any electronic device capable of providing or rendering data. User device 150 may optionally be portable. The user device 150 may be handheld. User device 150 may be a network device capable of connecting to a network, such as network 130, or other networks such as a local area network (LAN), wide area network (WAN) such as the Internet, a telecommunications network, a data network, or any other type of network.

Computer system 110 may be part of an entity 105, which may be any type of company, organization, or institution. In some examples, entity 105 may be a financial services provider, such as a bank, credit card issuer, merchant services providers, or other type of financial service entity. In such examples, the computer system 110 may have access to data pertaining to transactions through a private network within the entity 105. For example, if the entity 105 is a card issuer, entity 105 may collect and store data involving a credit card or debit card issued by the entity 105. In such examples, the computer system 110 may still receive data from other financial services providers. In some embodiments, entity 105 may provide a platform (e.g., an app on a user device) with which a user can interact. For example, the platform may receive data from the social network accounts associated with the user and/or data from the website data associated with the user. The platform may provide a vehicle suggestion to the user based on the social network accounts associated with the user and/or based on the website data associated with the user. The entity 105 may include one or more databases to store any information related to the user or the vehicle suggestion. The entity 105 may provide services associated with vehicle transactions.

Figure 2:
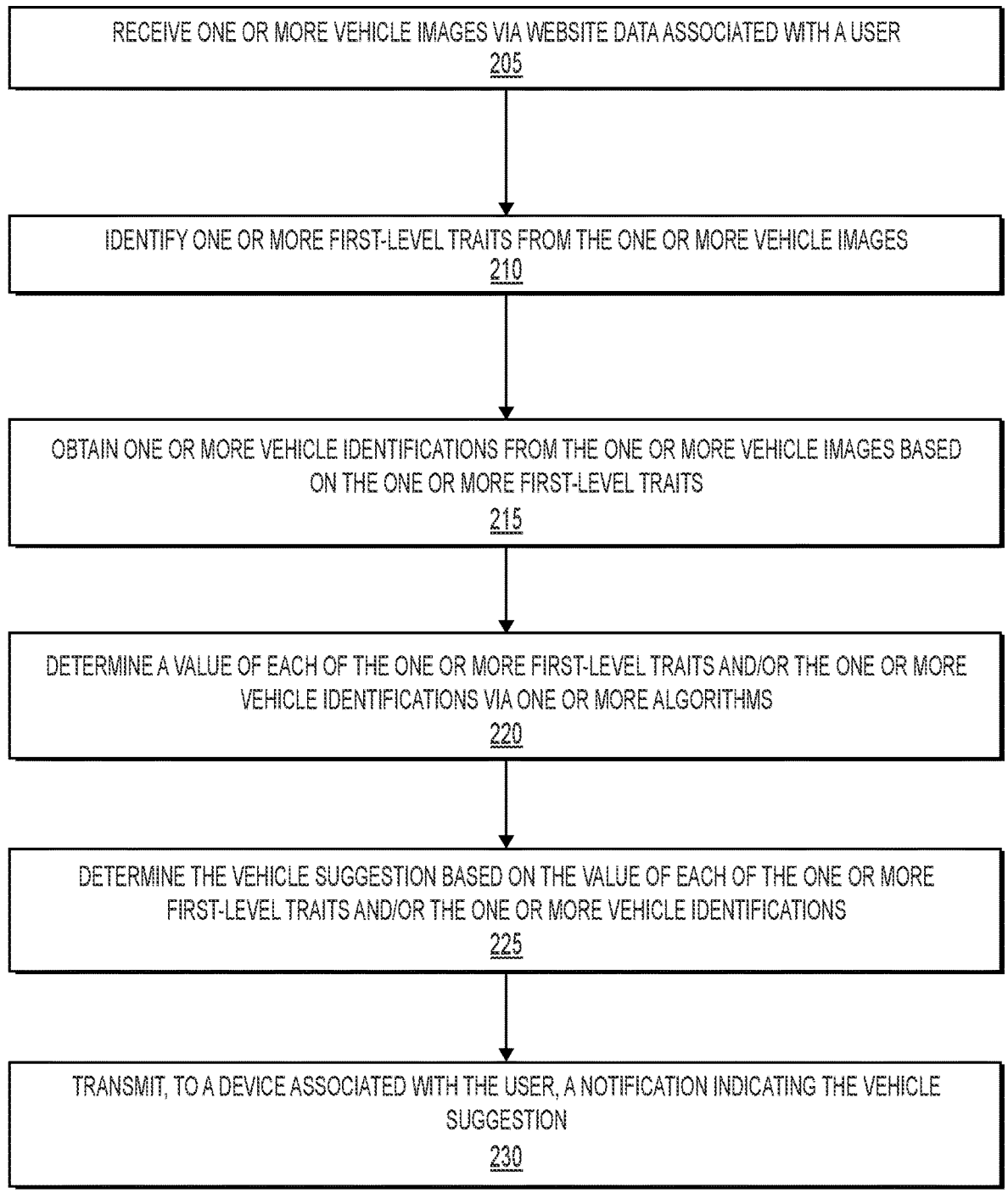
FIG. 2 depicts a flowchart of an exemplary method of providing a vehicle suggestion to a user, according to one or more embodiments.

FIG. 2 is a flowchart illustrating a method 200 for providing a vehicle suggestion to a user based on image analysis, according to one or more embodiments of the present disclosure. The method may be performed by computer system 110.

Step 205 may include receiving, via one or more processors, one or more vehicle images via website data associated with the user. A given vehicle image of the one or more vehicle images may include at least a picture of a vehicle. The one or more vehicle images may include at least one of a front side image, a back side image, a left side image, or a right side image of a vehicle. The one or more vehicle images may include an image of a vehicle from an angle. For instance, the image may include an image of the vehicle taken from a 45-degree angle relative to the horizontal plane parallel to the floor. The one or more vehicle images may be stored in one or more databases associated with one or more resources 140 (e.g., a social network sites 141 and/or browsing history resources 142) or entity 105.

Computer system 110 may access, or otherwise communicate with, the one or more resources 140 to receive the one or more vehicle images, as detailed above. For example, computer system 110 may access social network accounts and/or browser/website accounts associated with the user and pull the one or more vehicle images from the social network accounts and/or website data. In some embodiments, the social networks sites 141 and browsing history resources 142 may push the one or more vehicle images to the computer system 110. Computer system 110 may parse the website data and identify one or more vehicle images in the website data. Computer system 110 may then extract or otherwise isolate the one or more vehicle images from the website data. In some embodiments, computer system 110 may receive one or more vehicle images when the user posts, uploads, likes, favorites, pins, or otherwise associates, etc. the vehicle images on the social network sites 141. Thus, to receive the one or more vehicle images, computer system 110 may determine when the user associates a vehicle image with the social network account associated with the user. In accordance with a determination that the user associates a vehicle image with the social network account associated with the user, computer system 110 may receive (e.g., by push or pull) the vehicle image from the social network account associated with the user. As used herein, "associates a vehicle image" includes when a user posts, likes, favorites, pins, tweets, shares, comments on, views, etc. the vehicle image. For example, when the user "pins" a vehicle image on Pinterest, computer system 110 may determine that the user has associated the vehicle image with the social network account (e.g., the Pinterest account) associated with the user and may receive the vehicle image. In some embodiments, the determination that the user associates a vehicle image with the social network account associated with the user can include one or more thresholds. For example, computer system 110 may determine that the user has associated a vehicle image with the social network account associated with the user when the user has viewed the vehicle image (or a page, post, comment, etc. with the vehicle image) more than a threshold number of views (e.g., more than 10 views).

To identify a vehicle image from the website data, computer system 110 may use one or more algorithms. For example, algorithm model 112 can be trained to identify vehicle images from the website data. An exemplary algorithm model is described with respect to U.S. Pat. No. 10,140,553, which is incorporated by reference herein in its entirety. Thus, the trained model can parse images from the website data and extract only those images that contain vehicles. Computer system 110 may be configured to search for images associated with key words in the website data. In some embodiments, computer system 110 may receive or otherwise search for metadata in the images of the website data and classify the images based on the metadata. In some embodiments, computer system 110 may perform a keyword search in the images metadata of the website data. For example, computer system 110 may search for the word "car" in the image metadata and discard, or otherwise not extract or use, images whose metadata does not include the word "car." Thus, computer system 110 may only receive one or more vehicle images from the website data associated with the user. Thus, to receive the one or more vehicle images via the website data associated with the user, computer system 110 may search for the one or more vehicle images within the website data associated with the user. Computer system 110 may then receive only the one or more vehicle images from the website data associated with the user. In some embodiments, computer system 110 may receive the vehicle images when the user performs a search for vehicle images using, for example, a search engine. For example, when the user searches for "white 2019 Ford Explorer" or "white SUVs" in an image search engine, computer system 110 may receive one or more of the vehicle images that are returned by the search engine.

In some embodiments, computer system 110 may determine that the website data includes vehicle-related webpages, applications, social networking sites 141, etc., and may receive any vehicle images viewed by the user on the vehicle-related webpages, applications, and/or social networking sites 141. For example, computer system 110 may determine that the user has visited a webpage for 2019 Ford Explorers, and may receive (e.g., via push or pull) any vehicle images on the webpage. To determine that the website data includes vehicle-related data, the one or more algorithms described above may be trained to recognize vehicle-related webpages, applications, social network sites 141, etc. For example, computer system 110 may search for metadata and/or keywords associated with the webpages, applications, social network sites 141, etc. for vehicle-related words, as detailed above. In some embodiments, computer system 110 may include predetermined webpages, applications, social network sites 141, etc. that include vehicle images. Predetermined webpages, applications, social network sites 141, etc. may include specific webpages, applications, social network sites 141, etc. that are stored in a memory or database associated with computer system 110. When the website data associated with the user includes the predetermined webpages, applications, social network sites 141, etc., computer system 110 may receive (e.g., via push or pull) one or more vehicle images from the predetermined webpages, applications, social network sites 141, etc. For example, the predetermined webpage may include "exam pleautoblog.com" and when the user views a specific post, computer system 110 may receive any vehicle images associated with the specific post. Thus, computer system 110 may receive one or more vehicle images via the website data.

Step 210 may include identifying, via the one or more processors, one or more first-level traits from the one or more vehicle images. The one or more first-level traits may be identified directly from the one or more vehicle images. The step of identifying may be done via one or more algorithms (e.g., via algorithm model 112). Exemplary methods of identifying traits and/or features from images are described in U.S. Pat. No. 10,140,553, described above, and U.S. Pat. No. 10,223,611, which is incorporated by reference herein in its entirety. The one or more algorithms may include a trained machine learning algorithm (e.g., a natural language processing or convolutional neural network). The one or more first-level traits may include at least one of a make, a model, a body style, a color, a door count, or a seat count of one or more vehicles indicated via the one or more vehicle images. The one or more first-level traits may further include at least one of a weight, a mileage, or a height of the one or more vehicles indicated via the one or more vehicle images.

The one or more first-level traits may include additional exterior features such as a wheel feature, a color feature, a shape feature, vehicle class or a body style (e.g., convertible, coupe, sedan, hatchback, sport-utility vehicle, cross-over, minivan, van, or wagon), rear luggage compartment volume, door features (e.g., falcon wing doors, or automatic doors), light features (e.g., color and shape of the tail light), towing capacity (e.g., 4000 lbs. towing limit), mirror features (e.g., shape of the rear mirror, heated side mirrors), sensor and monitor features (e.g., including proximity sensors, humidity sensors, or temperatures sensors), or roof features (e.g., sun roof, moon roof, panoramic roof). The wheel feature may include, for example, the size (e.g., the diameter and width), the brand, the type, the safety level, the rim, the hubcap, or the material of the wheel. The color feature may include any information regarding colors or finishes of the exterior of the vehicle. The colors may include, by way of example, red, white, blue, black, silver, gold, yellow, orange, pink, green, or gray. The finishes of the exterior may include, for example, matte finish, pearlescent finish, metallic finish, or gloss finish. The shape feature of the vehicle may include the shape of any portion of the exterior of the vehicle, including, the shape of the front side of the vehicle, the shape of the flank side of the vehicle, or the shape of the back side of the vehicle. In some embodiments, the first-level traits may also include manufacturing year, which may be derived or otherwise determined by shape feature or other exterior features.

The one or more first-level traits may include additional interior features such as a material feature, an electronics feature, an engine feature, an add-on feature of the vehicle, the performance of the vehicle (e.g., track speed, 0-60 mph), the history of the vehicle (e.g., years of manufacturing, mileage), service features (e.g., 4 years of warranty), or break features. The material feature may include any information regarding the material of the interior of a vehicle, including, for example, the material of the seats (e.g., leather, cloth, suede, etc.). The electronics feature may include any information regarding electronics in the vehicle, including, for example, audio and multi-media (e.g., in-vehicle internet streaming music and media), internet browser, navigation system, on-board safety or convenience features (e.g., emergency breaking, self-driving, lane assist, self-parking). The engine feature may include any information regarding the engine of the vehicle, including, but not limited to, types of engines (e.g., internal combustion engines, external combustion engines, hybrid engines, or electronic-powered engines), engine layout (e.g., front engine layout), maximum engine speed, max engine power, design and cylinders, valves, drivetrain type (e.g., 4-wheel drive, all-wheel drive, front-wheel drive, or rear-wheel drive), transmission type (e.g., automatic or manual), fuel type (e.g., diesel, electric, gasoline, hybrid, or flex-fuel), or max torque. The add-on feature may include any additional interior features of the vehicle, including, seat features (e.g., heated seat, cooled seat), steering wheel features (e.g., heated steering wheel, cooled steering wheel), interior door features (e.g., metal handle), or sun visor feature (e.g., with vanity mirrors).

Step 215 may include obtaining, via the one or more processors, one or more vehicle identifications from the one or more vehicle images based on the one or more first-level traits. The vehicle identification may include a general identification of vehicle type. The vehicle type may include make, model, and/or manufacture year of the vehicle in the one or more vehicle images. For example, the one or more algorithms may identify that the vehicle type in the one or more vehicle images is a white 2019 Ford Explorer. The one or more vehicle identifications may also include one or more vehicle identification numbers (VINs). The vehicle identification number may be a unique code, including a serial number, used by the automotive industry to identify individual motor vehicles, towed vehicles, motorcycles, scooters and mopeds. The vehicle identification may be associated with any information about a vehicle stored in one or more databases. By using the vehicle identification, additional information of an individual vehicle may be obtained. Each vehicle may have a unique VIN. Such VINs may be extracted from one or more vehicle images using one or more algorithms. The one or more algorithms may include image processing algorithms. For instance, a vehicle identification may be shown on a certain part of the vehicle in a given vehicle image, and the one or more algorithms may capture and analyze the vehicle identification shown in the given vehicle image.

Step 220 may include determining, via the one or more processors, a value of each of the one or more first-level traits and/or the one or more vehicle identifications via one or more algorithms. The one or more algorithms may determine a frequency of each of the one or more first-level traits and/or the one or more vehicle identifications encompassed in the one or more vehicles indicated via the one or more vehicle images. The value may be calculated based on such frequency. For instance, if a white color vehicle appears in six vehicle images among the one or more vehicle images, then the value of the color white may be six. Such frequency may be used to determine which subset of the one or more first-level traits are more favorable to the user. Thus, each value may be a weighted value associated with the frequency that each first-level trait and/or each vehicle identification appear in the one or more vehicle images.

Further, if a specific vehicle type appears in six vehicle images, then the value of that specific vehicle type may be six. Such frequency may be used to determine that a user is interested in a specific vehicle type (e.g., white 2019 Ford Explorers). Such frequency may also be used to determine which subset of the one or more second-level traits appears more in one or more vehicle images. For example, in five vehicle images, all of the five images may present a white vehicle, and three of the five images may present a coupe type. In this situation, the value of the color white may be five, the value of coupe type may be three, and the more favorable traits may be a vehicle with a white color instead of a coupe type vehicle. In another example, among twenty vehicle images, all of the twenty images may present a vehicle with specific engine type (e.g., electronic vehicle) based on unique identifications (e.g., VINS) of the vehicle images, and ten of the twenty images may present a vehicle manufactured in 2018. Thus, the more favorable traits may be an electronic vehicle instead of a vehicle made in 2018. In this situation, the electronic vehicle and a vehicle made in 2018 may both be liked by the user, but the user may like the electronic vehicle more than a vehicle made in 2018 based on the images the user posts to social media and/or views while browsing. In yet another example, among six vehicle images from the browsing data, six of the images may represent a vehicle make A, five of the images may represent a four-door vehicle, two of the images may represent a two-door vehicle, one of the images may represent a black color vehicle, one of the images may represent a blue color vehicle, and one of the images may represent a red color vehicle. In this situation, the more favorable traits may be a 4-door vehicle made by make A, less favorable traits may be a 2-door vehicle made by make A, and the user may be indifferent among colors black, blue, and red of the vehicle. In some embodiments, different values may be assigned to different traits (e.g., first-level or second-level traits). For instance, the most frequently appearing features identified in the vehicle images (e.g., traits that appear in every vehicle image) may be assigned a value of 5 on a scale of 1 to 5, consistently but less frequently appearing features in vehicle images (e.g., traits that appear in 50% of vehicle images) may be assigned a value of 3 on the scale of 1 to 5, and indifferently appearing features in vehicle images (e.g., traits that appear in 10% of vehicle images) may be assigned as a value of 1 on the scale of 1 to 5. In another example, the value of the trait may be equal to how many times such trait appears in vehicle images. In this situation, if one trait appears in 10 vehicle images, then the value of the trait may be 10, and the trait with the highest value may be considered most favorable to the user.

Step 225 may include determining, via the one or more processors, the vehicle suggestion based on the value of each of the one or more first-level traits and/or the one or more vehicle identifications. In one example, the browsing data may include five vehicle images and all of the five images may present a white vehicle, and three of the five images may present a coupe type vehicle. In this situation, the vehicle suggestion may be a vehicle with a white color instead of a coupe type vehicle. In another example, the five vehicle images may all include white 2019 Ford Explorers. In this situation, the vehicle suggestion may be a white 2019 Ford Explorer. The determining the vehicle suggestion may include real-time updating of the vehicle suggestion based on one or more additional vehicle images received from the browsing data as the user browses the Internet or posts images on social media, as detailed above. The determining the vehicle suggestion may include determining the vehicle suggestion via a trained machine learning algorithm. The trained machine learning algorithm may be configured to utilize principal component analysis. Details of the trained machine learning algorithm are described elsewhere herein.

The vehicle suggestion may include a recommended vehicle, or a plurality of recommended vehicles, available for purchase. The vehicle suggestion may include any information regarding the recommended vehicle(s) including, but not limited to, images, prices, models, makes, years of manufacturing, or mileages of the recommended vehicle(s). The vehicle suggestion may also include any information regarding one or more dealers who may sell the recommended vehicle(s), including, but not limited to, the names of the dealers or the addresses of the dealers. The vehicle suggestion may also include any information regarding purchasing a vehicle by the user, for example, a recommended location to purchase the recommended vehicle(s), or a recommended time to purchase the recommended vehicle(s). The vehicle suggestion may include upgrade or repair information specific to the recommended vehicle(s), news articles pertaining to the recommended vehicle(s), possible substitute or compatible items for the recommended vehicle(s), and so forth. Although a vehicle suggestion is described herein as an example, the method can be utilized to provide suggestion for other products. The product may be any item or service sold by a merchant.

Step 230 may include transmitting, to the device associated with the user, a notification indicating the vehicle suggestion. The notification indicating the vehicle suggestion may include an image of one or more recommended vehicles. The notification may be configured to be displayed on a user interface of the device associated with the user (user device 150). The notification may include an interactive feature configured to enable the user to accept or reject the vehicle suggestion. The notification may include information regarding the vehicle suggestion. The notification may be displayed in a user interface. In some embodiments, the notification may be configured to be displayed on a display screen of a user device associated with the user (e.g., user device 150). The notification may be displayed on the display screen in any suitable form, such as an e-mail, a text message, a push notification, content on a webpage, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor.

Some embodiments may include, determining, via the one or more processors, one or more second-level traits based on the one or more vehicle identifications. The one or more second-level traits may not be obtained directly from the one or more user-selected images. Instead, the one or more second-level traits may be determined based on vehicle identification. In one example, since each vehicle may have a unique vehicle identification, the one or more second-level traits may be determined based on characteristics or information of a vehicle associated with the unique vehicle identification. Such characteristics or information of a vehicle may be stored in one or more databases, and the vehicle identification may be used to access the characteristics or information of the vehicle. The VIN may be associated with any vehicle information stored in one or more databases associated with one or more resources 140 (e.g., a vehicle loan provider). By using the VIN, vehicle information may be obtained by connecting a unique VIN to an individual vehicle having such VIN. The one or more second-level traits may include any information of the vehicle that can be obtained based on the vehicle identification, including, at least one of an engine type, a manufacturing region, or a manufacturing year of the one or more vehicles indicated via the one or more user-selected images. The one or more second-level traits may further include at least a vehicle price of the one or more vehicles indicated via the one or more user-selected images.

In some embodiments, computer system 110 may generate a matrix of first-level traits, second-level traits and/or vehicle identifications based on the weighted values. For example, the matrix may plot the various first-level traits, second-level traits, and/or the vehicle identifications based on the frequency that each first-level trait, second-level trait, and/or vehicle identification appears in the one or more vehicle images. The weighted values may also include weights based on more recently viewed vehicle images from the website data. For example, traits and/or vehicle identifications that appear in vehicle images that the user viewed within the past thirty days may receive a higher weight than traits and/or vehicle identifications that appear in vehicle images that the user viewed longer than thirty days ago.

Computer system 110 may use term frequency-inverse document frequency (tf-idf) to determine the frequency that the first-level traits, second-level traits, and/or vehicle identifications appear in the website data and to generate the matrix. As used herein, tf-idf is a numerical statistic that reflects how important an trait (e.g., first-level and/or second-level) and/or vehicle identification is to a specific webpage, application, social network site 141, etc. in the website data. For example, the tf-idf value increases proportionally to the number of times an trait and/or vehicle identification appears in the specific webpage, application, social network site 141, etc. and is offset by the number of webpages, applications, social network sites 141, etc. in the website data that contain that trait and/or vehicle identification. Thus, tf-idf may be used to score and rank a specific webpage, application, and/or social network site 141, etc. relevance given the website data.

Figure 3:
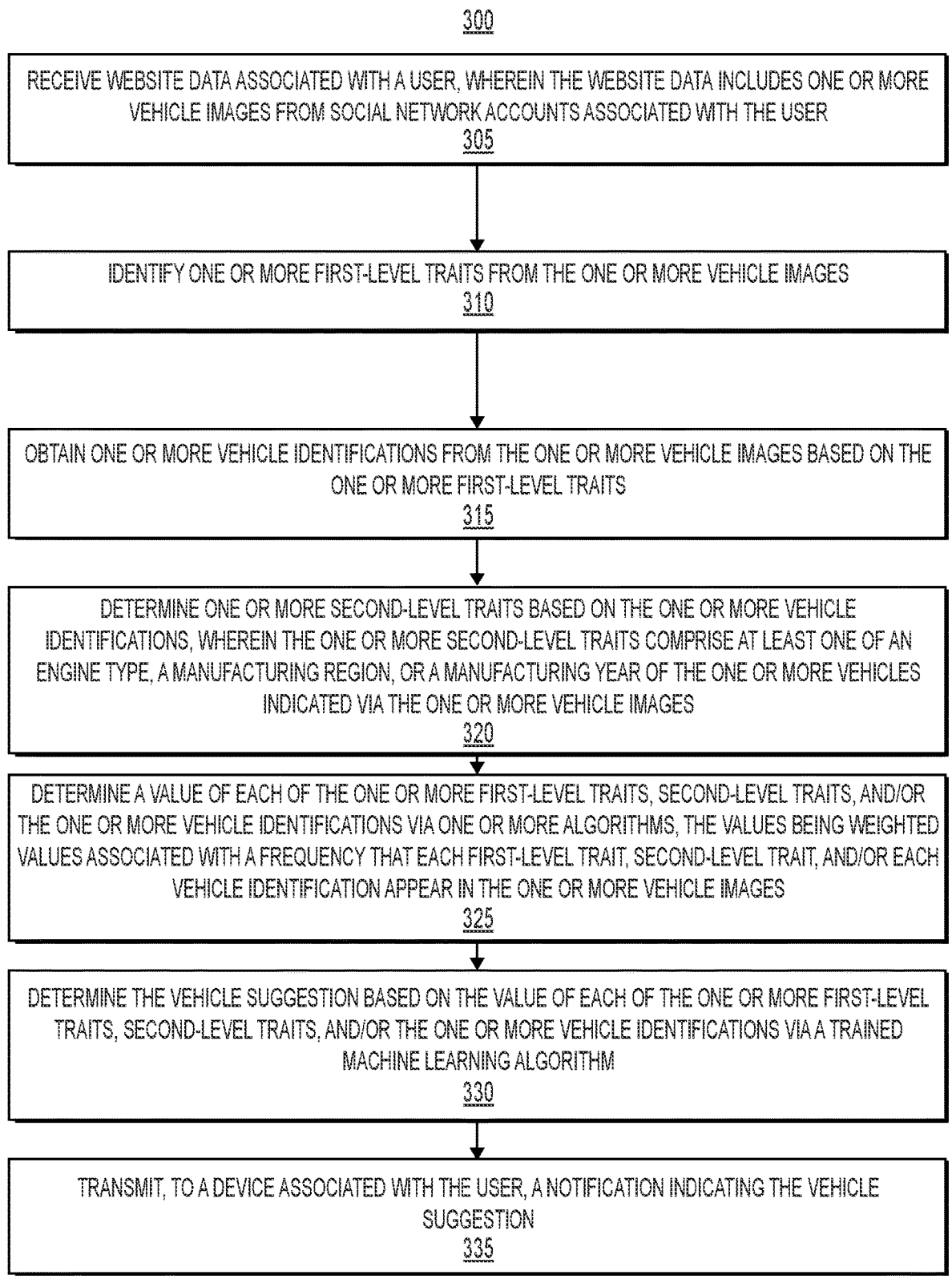
FIG. 3 depicts a flowchart of another exemplary method of providing a vehicle suggestion to a user, according to one or more embodiments.

FIG. 3 is a flowchart illustrating another exemplary method 300 for providing a vehicle suggestion to the user, according to one or more embodiments of the present disclosure. The method may be performed by computer system 110.

Step 305, similarly to step 205, may include receiving, via one or more processors, website data, wherein the website data includes one or more vehicle images from social network accounts associated with the user. A given vehicle image of the one or more vehicle images may include at least a picture of a vehicle. The receiving step may be performed, as detailed above with respect to step 205. Step 310, similarly to step 210, may include identifying, via the one or more processors, one or more first-level traits from the one or more vehicle images. The one or more first-level traits may include at least one of a make, a model, a color, a door count, or a seat count of one or more vehicles indicated via the one or more user-selected images, as detailed above. Step 315, similarly to step 215, may include obtaining, via the one or more processors, one or more vehicle identifications from the one or more vehicle images based on the one or more first-level traits. Step 320 may include determining, via the one or more processors, one or more second-level traits based on the one or more vehicle identifications. The one or more second-level traits may include at least one of an engine type, a manufacturing region, or a manufacturing year of the one or more vehicles indicated via the one or more vehicle images. Step 325, similarly to step 220, may include determining, via the one or more processors, a value of each of the one or more first-level traits, the one or more second-level traits, and/or the one or more vehicle identifications via one or more algorithms. The values may be weighted values associated with a frequency that each first-level trait, second-level trait, and/or vehicle identification appear in the one or more vehicle images. Details of one or more vehicle images, one or more first-level traits, one or more vehicle identifications, one or more second-level traits, and the values are described elsewhere herein.

In step 330, computer system 110 may determine the vehicle suggestion based on the value of each of the one or more first-level traitrs, second-level traits, and/or the one or more vehicle identifications via a trained machine learning algorithm. The trained machine learning algorithm may include a regression-based model that accepts the one or more vehicle images, one or more first-level traits, one or more vehicle identifications, one or more second-level traits, values of one or more first-level traits and/or second-level traits, and/or vehicle suggestion as input data. The trained machine learning algorithm may be part of the algorithm model 112. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented, one or more internal layers, and an output layer. The number of neurons in each layer may be related to the complexity of a problem to be solved. Input neurons may receive data being presented and then transmit the data to the first internal layer through the connections' weight. The trained machine learning algorithm may include a convolutional neural network (CNN), a deep neural network, or a recurrent neural network (RNN).

A CNN may be a deep and feed-forward artificial neural network. A CNN may be applicable to analyzing visual images, such as the one or more vehicle images or one or more user-selected images, described elsewhere herein. A CNN may include an input layer, an output layer, and multiple hidden layers. Hidden layers of a CNN may include convolutional layers, pooling layers, or normalization layers. Layers may be organized in three dimensions: width, height, and depth. The total number of convolutional layers may be at least about 3, 4, 5, 10, 15, 20 or more. The total number of convolutional layers may be at most about 20, 15, 10, 5, 4, or less.

Convolutional layers may apply a convolution operation to an input and pass results of a convolution operation to a next layer. For processing images, a convolution operation may reduce the number of free parameters, allowing a network to be deeper with fewer parameters. In a convolutional layer, neurons may receive input from only a restricted subarea of a previous layer. A convolutional layer's parameters may comprise a set of learnable filters (or kernels). Learnable filters may have a small receptive field and extend through the full depth of an input volume. During a forward pass, each filter may be convolved across the width and height of an input volume, compute a dot product between entries of a filter and an input, and produce a 2-dimensional activation map of that filter. As a result, a network may learn filters that activate when detecting some specific type of feature at some spatial position as an input.

An RNN may be configured to receive sequential data (e.g., user feedback data) as an input, such as consecutive data inputs, and the RNN may update the internal state at every time step. An RNN can be applicable to tasks such as image captioning or time series anomaly detection. The RNN may include a fully recurrent neural network, independently recurrent neural network, Jordan networks, Echo state, neural history compressor, gated recurrent unit, multiple timescales model, differentiable neural computer, or any combination thereof.

The trained machine learning algorithm may compute the vehicle suggestion as a function of the one or more vehicle images, one or more first-level traits, one or more vehicle identifications, one or more second-level traits, values of one or more first-level traits and/or second-level traits, or one or more variables indicated in the input data. The one or more variables may be derived from the one or more vehicle images, one or more user-selected images, one or more first-level traits, one or more vehicle identifications, one or more second-level traits, or values of one or more first-level traits and/or second-level traits. This function may be learned by training the machine learning algorithm with training sets.

The machine learning algorithm may be trained by supervised, unsupervised, or semi-supervised learning using training sets comprising data of types similar to the type of data used as the model input. For example, the training set used to train the model may include any combination of the following: the one or more vehicle images or images selected by third-parties other than the user, one or more first-level traits associated with vehicle images or images selected by third-parties other than the user, one or more vehicle identifications associated with vehicle images or images selected by third-parties other than the user, one or more second-level traits associated with vehicle identifications, values of one or more first-level traits and/or second-level traits, or vehicle suggestion to the user or to the third-parties other than the user. Additionally, the training set used to train the model may further include user data, including, but not limited to, demographic information of the user or other data related to the user. Accordingly, the machine learning model may be trained to map input variables to a quantity or value of a vehicle suggestion for the user. That is, the machine learning model may be trained to determine a quantity or value of the vehicle suggestion of the user as a function of various input variables.

In step 335, computer system 110 may transmit, to the device associated with the user, a notification indicating the vehicle suggestion. The notification may include an interactive feature configured to enable the user to accept or reject the vehicle suggestion. The notification may be configured to be displayed on the user interface of the device associated with the user. The notification indicating the vehicle suggestion may include an image of a recommended vehicle. The notification may include an interactive feature configured to enable the user to accept or reject the vehicle suggestion. The notification may include information regarding the vehicle suggestion. The notification may be displayed in a user interface. In some embodiments, the notification may be configured to be displayed on a display screen of a user device associated with the user (e.g., user device 150). The notification may be displayed on the display screen in any suitable form, such as an e-mail, a text message, a push notification, content on a webpage, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor.

At any stage of providing a vehicle suggestion, the method may further include storing the one or more vehicle images, one or more first-level traits, one or more vehicle identifications, one or more second-level traits, values of one or more first-level traits and/or second-level traits, or vehicle suggestion for subsequent analysis. The stored data may have an expiration period. The expiration period may be at least 1 day, 1 week, 1 month, 1 quarter, 1 year, or longer. In other embodiments, the expiration period may be at most 1 year, 1 quarter, 1 month, 1 week, 1 day, or shorter. The subsequent analysis may include analyzing the vehicle suggestion to update the one or more vehicle images, one or more first-level traits, one or more vehicle identifications, one or more second-level traits, or values of one or more first-level traits and/or second-level traits. The stored data may also be one of the one or more variables used in training a trained machine learning model. Details of the trained machine learning model are described elsewhere herein.

The method disclosed herein may provide a passive vehicle suggestion to a user efficiently. For instance, by receiving vehicle images from website data associated with the user, available vehicles may be sorted, removed, or selected without requiring the user to manually select one or more filters (e.g., typing in a search box, or choosing from a drop down menu) to select vehicles, especially when the user is unsure which filter to type or select. The method disclosed herein may provide a user a real-time vehicle suggestion while the user has viewed, posted, liked, favorited, pinned, or otherwise associated with, one or more vehicle images. With each vehicle image the user associates with, computer system 110 may update the vehicle images received and update the vehicle suggestion accordingly. As the user views, posts, likes, favorites, pins, or otherwise associates with, more vehicle images, computer system 110 may refine or otherwise update the vehicle suggestion. In some embodiments, computer system 110 may determine the vehicle suggestions based on a threshold number of vehicle images. For example, the methods 200, 300 may proceed if the number of vehicle images received by computer system 110 exceeds the threshold.

In general, any process discussed in this disclosure that is understood to be computer-implementable, such as the processes illustrated in FIGS. 2 and 3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as computer system 110 and/or user device 150, may include one or more computing devices. If the one or more processors of the computer system 110 and/or user device 150 are implemented as a plurality of processors, the plurality of processors may be included in a single computing device or distributed among a plurality of computing devices. If computer system 110 and/or user device 150 comprises a plurality of computing devices, the memory of the computer system 110 may include the respective memory of each computing device of the plurality of computing devices.

Figure 4:
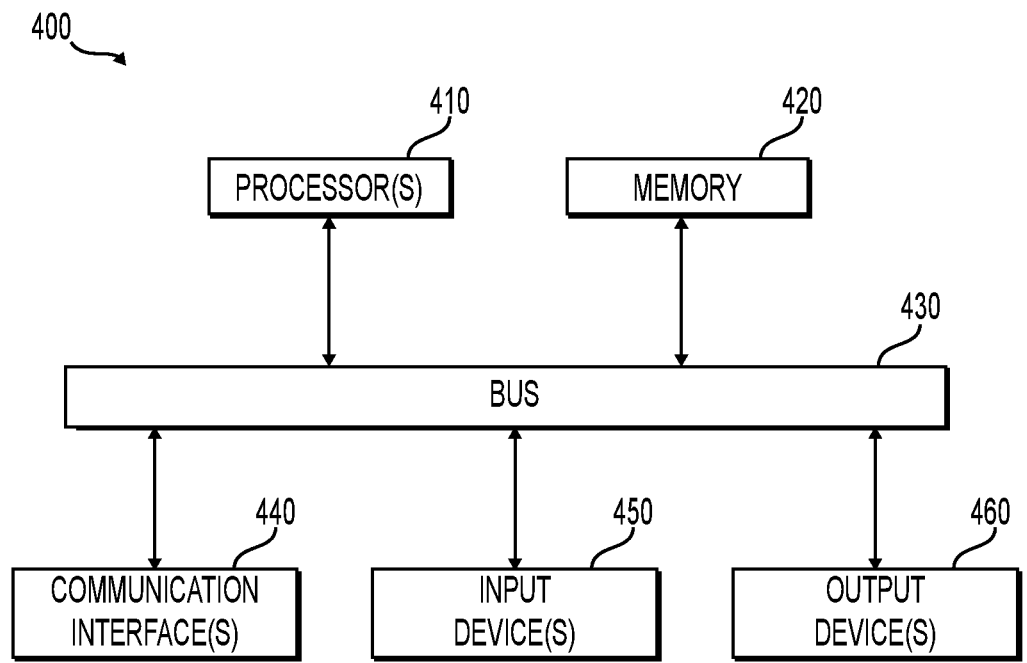
FIG. 4 depicts an example of a computing device, according to one or more embodiments.

FIG. 4 illustrates an example of a computing device 400 of a computer system, such as computer system 110 and/or user device 150. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing a vehicle suggestion to a user based on image analysis, the method comprising:
   receiving, via one or more processors of a computer system associated with an entity, an indication from a device associated with the user granting the entity access to website data associated with the user from a plurality of resources independent of the entity;
   based on the access granted and an occurrence of an initial interaction of the user with one or more of the plurality of resources, receiving, via the one or more processors, an initial set of website data associated with the initial interaction from the one or more of the plurality resources;
   identifying, via one or more processors, an initial set of one or more vehicle images from the initial set of website data;
   identifying, via the one or more processors, one or more first-level traits from the initial set of one or more vehicle images, wherein the one or more first-level traits comprise at least one of a make, a model, a body style, a color, a door count, or a seat count of one or more vehicles in the initial set of one or more vehicle images;
   obtaining, via the one or more processors, one or more vehicle identifications from the initial set of one or more vehicle images based on the one or more first-level traits;
   determining, via the one or more processors, a first value of each of the one or more first-level traits and/or the one or more vehicle identifications via one or more algorithms;
   determining, via the one or more processors, a vehicle suggestion based on the first value of each of the one or more first-level traits and/or the one or more vehicle identifications;
   transmitting, to the device or another device associated with the user, a notification indicating the vehicle suggestion;
   based on the access granted and each occurrence of a subsequent interaction of the user with a same or a different one or more of the plurality of resources, iteratively receiving, via the one or more processors, a next set of website data associated with the respective subsequent interaction from the one or more of the plurality resources; and
   as each next set of website data is received:
      identifying, via the one or more processors, a next set of one or more vehicle images from the next set of website data;
      updating, via the one or more processors, the vehicle suggestion by adjusting the first value of at least one of the one or more first-level traits identified and/or the one or more vehicle identifications obtained from the initial set of website data, wherein the first value is adjusted based on a second value determined for each of one or more first-level traits identified from the next set of one or more vehicle images and/or one or more vehicle identifications obtained from the next set of one or more vehicle images; and transmitting an updated notification indicating the updated vehicle suggestion to the device or the other device associated with the user.

2. The computer-implemented method of claim 1, wherein the plurality of resources include one or more social network sites, at least one of the initial set of website data or the next set of website data includes data from one or more social network accounts associated with the user received from the one or more network sites, and at least one of the one or more vehicle images identified from the initial set of website data or the next set of website data respectively includes a vehicle image from the one or more social network accounts.

3. The computer-implemented method of claim 2, wherein
the at least one of the initial interaction of the user or the subsequent interaction of the user includes an association of the vehicle image with the one or more social network accounts.

4. The computer-implemented method of claim 1, wherein each first value is a weighted value associated with a frequency that each of the one or more first-level traits and/or each of the one or more vehicle identifications appear in the initial set of one or more vehicle images.

5. The computer-implemented method of claim 4, further including:
generating, via the one or more processors, a matrix of the one or more first-level traits and/or the one or more vehicle identifications based on each weighted value; and
determining, via the one or more processors, the vehicle suggestion based on the matrix.

6. The computer-implemented method of claim 4, wherein each weighted value includes a weight based on more recently viewed vehicle images from the initial set of website data.

7. The computer-implemented method of claim 1, further including:
determining, via the one or more processors, one or more second-level traits based on the one or more vehicle identifications obtained from the initial set of one or more vehicle images, wherein the one or more second-level traits comprise at least one of an engine type, a manufacturing region, or a manufacturing year of the one or more vehicles indicated via the initial set of one or more vehicle images;
determining, via the one or more processors, a first value of each of the one or more second-level traits; and
determining, via the one or more processors, the vehicle suggestion based on the first value of each of the one or more first-level traits and the one or more second-level traits.

8. The computer-implemented method of claim 7, wherein the one or more second-level traits further include at least a vehicle price of the one or more vehicles indicated via the initial set of one or more vehicle images.

9. The computer-implemented method of claim 1, wherein determining the vehicle suggestion includes determining the vehicle suggestion via a trained machine learning algorithm.

10. The computer-implemented method of claim 1, wherein the website data includes one or more types of website data, and receiving the indication granting access to website data comprises receiving login information for the one or more types of the website data.

11. The computer-implemented method of claim 1, wherein the website data associated with the user to which access is granted is only a subset of a plurality of types of website data.

12. A computer system for providing a vehicle suggestion to a user based on image analysis, comprising:
a memory storing instructions; and
one or more processors configured to execute the instructions to perform operations including:
receiving an indication from a device associated with the user granting access to website data associated with the user;
based on the access granted and an occurrence of an initial interaction of the user with an initial set of website data, receiving the initial set of website data;
identifying an initial set of one or more vehicle images from the initial set of website data;
identifying one or more first-level traits from the initial set of one or more vehicle images, wherein the one or more first-level traits comprise at least one of a make, a model, a body style, a color, a door count, or a seat count of one or more vehicles in the initial set of one or more vehicle images;
obtaining one or more vehicle identifications from the initial set of one or more vehicle images based on the one or more first-level traits;
determining a first value of each of the one or more first-level traits and/or the one or more vehicle identifications via one or more algorithms;
determining a vehicle suggestion based on the first value of each of the one or more first-level traits and/or the one or more vehicle identifications;
transmitting, to the device or another device associated with the user, a notification indicating the vehicle suggestion;
based on the access granted and each occurrence of a subsequent interaction of the user with a next set of website data, iteratively receiving, via the one or more processors, the next set of website data; and
as each next set of website data is received:
identifying, via the one or more processors, a next set of one or more vehicle images from the next set of website data;
updating, via the one or more processors, the vehicle suggestion by adjusting the first value of at least one of the one or more first-level traits identified and/or the one or more vehicle identifications obtained from the initial set of website data, wherein the first value is adjusted based on a second value determined for each of one or more first-level traits identified from the next set of one or more vehicle images and/or one or more vehicle identifications obtained from the next set of one or more vehicle images; and
transmitting an updated notification indicating the updated vehicle suggestion to the device or the other device associated with the user.

13. The computer system of claim 12, wherein at least one of the initial set of website data or the next set of website data includes data from one or more social network accounts associated with the user, and at least one of the one or more vehicle images identified from the initial set of website data or the next set of website data respectively includes a vehicle image from the one or more social network accounts.

14. The computer system of claim 13, wherein the at least one of the initial interaction of the user or the subsequent interaction of the user includes an association of the vehicle image with the one or more social network accounts.

15. The computer system of claim 12, wherein each first value is a weighted value associated with a frequency that each of the one or more first-level traits and/or each of the one or more vehicle identifications appear in the one or more initial set of vehicle images.

16. The computer system of claim 15, wherein the operations further include:
generating a matrix of the one or more first-level traits and/or the one or more vehicle identifications based on each weighted value; and
determining the vehicle suggestion based on the matrix.

17. The computer system of claim 15, wherein each weighted value includes a weight based on more recently viewed vehicle images from the initial set of website data.

18. The computer system of claim 12, wherein the operations further include:
determining one or more second-level traits based on the one or more vehicle identifications obtained from the initial set of one or more vehicle images, wherein the one or more second-level traits comprise at least one of an engine type, a manufacturing region, or a manufacturing year of the one or more vehicles indicated via the initial set of one or more vehicle images;
determining a first value of each of the one or more second-level traits; and
determining the vehicle suggestion based on the first value of each of the one or more first-level traits and the one or more second-level traits.

19. The computer system of claim 12, wherein determining the vehicle suggestion includes determining the vehicle suggestion via a trained machine learning algorithm.

20. A computer-implemented method for providing a vehicle suggestion to a user based on image analysis, the method comprising:
iteratively receiving, via one or more processors, website data associated with the user, wherein the website data includes an initial set of one or more vehicle images from social network accounts associated with the user received based on an occurrence of an initial interaction of the user with the initial set, and a next set of one or more vehicle images from the social network accounts received based on each occurrence of a subsequent interaction of the user with the next set;
detecting, via the one or more processors, an opening of an application on a device associated with the user, the application associated with vehicle searching; and
in response to the opening of the application and without the user further interacting with the application, providing an up-to-date vehicle suggestion based on the website data for automatic display within a user interface of the application by:
identifying, via the one or more processors, one or more first-level traits from the initial set of one or more vehicle images, wherein the one or more first-level traits comprise at least one of a make, a model, a body style, a color, a door count, or a seat count of one or more vehicles in the initial set of one or more vehicle images;
obtaining, via the one or more processors, one or more vehicle identifications from the initial set of one or more vehicle images based on the one or more first-level traits;
determining, via the one or more processors, one or more second-level traits based on the one or more vehicle identifications, wherein the one or more second-level traits comprise at least one of an engine type, a manufacturing region, or a manufacturing year of the one or more vehicles indicated via the initial set of one or more vehicle images;
determining, via the one or more processors, a first value of each of the one or more first-level traits, the one or more second-level traits, and/or the one or more vehicle identifications via one or more algorithms, each first value being a weighted value associated with a frequency that each of the one or more first-level traits, the one or more second-level traits, and/or the one or more vehicle identifications appear in the initial set of one or more vehicle images;
determining, via the one or more processors, a vehicle suggestion based on the first value of each of the one or more first-level traits, the one or more second-level traits, and/or the one or more vehicle identifications;
as each next set of one or more vehicle images is received, updating, via the one or more processors, the vehicle suggestion by adjusting the first value of at least one of the one or more first-level traits identified, the one or more second-level traits identified, and/or the one or more vehicle identifications obtained from the initial set of one or more vehicle images, wherein the first value is adjusted based on a second value determined for each of one or more first-level traits identified from the next set of one or more vehicle images, one or more vehicle identifications obtained from the next set of one or more vehicle images, and/or one or more second-level traits identified based on the one or more vehicle identifications obtained from the next set of one or more vehicle images; and
transmitting, to the device associated with the user, a notification indicating the updated vehicle suggestion for the automatic display within the user interface of the application in response to the opening of the application.

* * * * *